(12) United States Patent
Park

(10) Patent No.: US 12,382,129 B2
(45) Date of Patent: Aug. 5, 2025

(54) DISPLAY DEVICE AND OPERATING METHOD THEREFOR

(71) Applicant: LG ELECTRONICS INC., Seoul (KR)

(72) Inventor: Jongha Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 173 days.

(21) Appl. No.: 18/248,640

(22) PCT Filed: Oct. 28, 2021

(86) PCT No.: PCT/KR2021/015346
§ 371 (c)(1),
(2) Date: Apr. 11, 2023

(87) PCT Pub. No.: WO2022/092871
PCT Pub. Date: May 5, 2022

(65) Prior Publication Data
US 2023/0388580 A1    Nov. 30, 2023

(30) Foreign Application Priority Data
Oct. 28, 2020    (KR) ........................ 10-2020-0141522

(51) Int. Cl.
*H04N 21/436*    (2011.01)
*G06F 3/0481*    (2022.01)
(Continued)

(52) U.S. Cl.
CPC ..... *H04N 21/43615* (2013.01); *G06F 3/0481* (2013.01); *G06F 3/14* (2013.01); *H04N 21/4307* (2013.01)

(58) Field of Classification Search
CPC ......... H04N 21/43615; H04N 21/4307; H04N 5/642; H04N 21/43635; H04N 1/3877;
(Continued)

(56) References Cited

U.S. PATENT DOCUMENTS

2006/0291151 A1* 12/2006 Chen ...................... F16M 11/10
                                                                 361/679.06
2010/0245390 A1*  9/2010 Goodart ................ G06F 3/1415
                                                                 345/649

(Continued)

FOREIGN PATENT DOCUMENTS

JP          2004-364024          12/2004
JP          2006217307 A    *   8/2006
(Continued)

OTHER PUBLICATIONS

PCT International Application No. PCT/KR2021/015346, International Search Report dated Feb. 21, 2022, 4 pages.

*Primary Examiner* — Cynthia M Fogg
(74) *Attorney, Agent, or Firm* — LEE, HONG, DEGERMAN, KANG & WAIMEY

(57) ABSTRACT

A display device according to an embodiment of the present disclosure may comprise: a display unit, an audio output unit disposed below the display unit, an external device interface unit connected to a sound bar through an HDMI Audio Return Channel (HDMI ARC) and a control unit configured to request audio delay information from the sound bar through the external device interface unit in a state in which the display unit is arranged in an upside-down inverted state, receive the audio delay information from the sound bar through the external device interface unit, and determine an output timing of audio based on the received audio delay information.

11 Claims, 13 Drawing Sheets

(51) Int. Cl.
*G06F 3/14* (2006.01)
*H04N 21/43* (2011.01)

(58) Field of Classification Search
CPC ..... H04N 5/04; G06F 3/14; G06F 2200/1614;
G06F 3/0346; G06F 1/1605; G06F 3/147;
G06F 3/16–167; G09G 5/12
USPC .......................................................... 725/151
See application file for complete search history.

(56) References Cited

U.S. PATENT DOCUMENTS

| | | | |
|---|---|---|---|
| 2015/0334338 A1* | 11/2015 | Lim | H04N 21/43637 348/515 |
| 2016/0014537 A1* | 1/2016 | Lehnert | G06F 3/165 381/58 |
| 2016/0330562 A1* | 11/2016 | Crockett | H04S 7/307 |
| 2018/0067714 A1* | 3/2018 | Pucci | H04R 3/12 |
| 2018/0278811 A1* | 9/2018 | Winsvold | H04N 21/4392 |
| 2020/0092515 A1* | 3/2020 | Stern | G06F 3/165 |
| 2021/0243491 A1* | 8/2021 | Kraegeloh | H04N 21/43072 |
| 2022/0377437 A1* | 11/2022 | Song | H04N 21/8547 |

FOREIGN PATENT DOCUMENTS

| | | |
|---|---|---|
| KR | 10-2012-0074700 | 7/2012 |
| KR | 10-2014-0018701 | 2/2014 |
| KR | 10-2017-0093508 | 8/2017 |
| KR | 10-2018-0102501 | 9/2018 |

\* cited by examiner

<TV sound characteristics according to the presence or absence of sound bar structure shape>

FIG. 12

| Opcode | | Opcode | Value | Parameter | description |
|---|---|---|---|---|---|
| TV→SB | | <Request SB delay> | 0x40 | | request for an audio delay value of the sound bar |
| | | <Request support Sympony soundbar> | 0x42 | | request whether support the Symphony sound bar |
| | Vendor specific (0x89) | <block sound effect> | 0x44 | 0:release 1:block | Whether to ignore the key when changing the sound field with the sound bar remote controller in TV sound mode |
| | | <Set soundbar volume> | 0x46 | volume value | Soundbar setting volume for TV and volume sync (sound bar Max volume : 40) |
| SB→TV | | <Response SB delay> | 0x41 | audio delay | Respond to the soundbar's audio delay |
| | | <Response support Sympony> | 0x43 | 0:unsupport 1:support | Respond whether sound bar support symphony |
| | | <Give3 status of block sound effect> | 0x45 | 0:release 1:block | Whether the sound bar's sound effect key is blocked (display on the TV that the sound field key of the sound bar is ignored in sound field blocking mode) |

FIG. 13

| Opcode | | Opcode | Value | Parameter | description |
|---|---|---|---|---|---|
| TV→SB | 0x89 | <Response AI sound mode> | 0x48 | 0:not support 1:support | Respond TV's AI sound mode |
| SB→TV | | <Request AI sound mode> | 0x47 | | Respond TV's AI sound mode |

FIG. 14

| 1depth | 2depth | 3depth | 4depth | 5depth |
|---|---|---|---|---|
| | Select Mode | AI Sound Pro/AI Sound Standard Cinema Clear Voice Pro/Clear Voice Sports Music Game Optimizer | | |
| | Sound Out | Use TV Speaker | | |
| | | Use Wireless Speaker | Bluetooth Device | |
| | | | WiSa Speakers | |
| | | | Mobile Device | |
| | | Use Wired Speaker | Optical Out Device | |
| | | | HDMI (ARC) Device | |
| | | | Audio Out Device | |
| | | Use Multiple Speakers | Bluetooth Device+TV Speaker | |
| | | | Optical Out Device+TV Speaker | |
| | | | Wired Headphones+TV Speaker | |
| | Adcanced Settings | DOLBY ATMOS | Off/on | |
| | | Balance | L50~R50 | |
| | | Equalizer | Off/On | |
| | | | detail setting | 100Hz(-10~10)/300Hz(-10~10)/1khz(-10~10) /3kHz(-10~10)/10kHz(-10~10) |
| | 1410 → | Installation Type | Stand/Wall-mounted/Reversal | |
| | | Auto Volume | Off/On | |
| | | DTV Audio Setting | Auto/HE-AAC/Dolby Digital /Dolby Digital+MPEG/DRA | provide only DBV |
| | | AV Sync Adjustment | {present Soound out name} | 0~15 |
| | | | Bypass | Off/On |
| | | HDMI Input Audio Format | Bitstream/PCM | |
| | 1430 → | TV Sound Mode Share, | Off/On | |
| | | Sound Bat Mode Control | Off/On | |
| | | Volume Control | Off/On | |
| | | Digital Sound Out | Auto/Pass Through/PCM | |
| | | eARC | Off/On | |
| | | Reset | | |

DISPLAY DEVICE AND OPERATING METHOD THEREFOR

CROSS-REFERENCE TO RELATED APPLICATIONS

This application is the National Stage filing under 35 U.S.C. 371 of International Application No. PCT/KR2021/015346, filed on Oct. 28, 2021, which claims the benefit of earlier filing date and right of priority to Korean Application No. 10-2020-0141522, filed on Oct. 28, 2020, the contents of which are all incorporated by reference herein in their entirety.

TECHNICAL FIELD

The present invention relates to a display device and an operating method thereof.

BACKGROUND ART

A digital TV service using a wired or wireless communication network is becoming common. The digital TV service can provide various services that could not be provided in the existing analog broadcasting service.

For example, IPTV (Internet Protocol Television) and smart TV services, which are types of digital TV services, provide bi-directionality that allows users to actively select the type of program to watch and the viewing time. IPTV and smart TV services may provide various additional services, such as Internet search, home shopping, and online games, based on this interactive nature.

Also, recently, an interworking system between a TV and a sound bar outputting audio transmitted by the TV has been implemented.

However, there is a problem in that sound quality is deteriorated due to interference between audio output from downward-facing speakers built in the TV and audio output from a sound bar disposed below the TV.

DISCLOSURE

Technical Problem

An object of the present disclosure is to prevent deterioration of audio output sound quality if a display device and a sound bar are interlocked.

An object of the present disclosure is to synchronize audio output timing if a display device and a sound bar are interlocked.

Technical Solution

A display device according to an embodiment of the present disclosure may comprise: a display unit, an audio output unit disposed below the display unit, an external device interface unit connected to a sound bar through an HDMI Audio Return Channel (HDMI ARC) and a control unit configured to request audio delay information from the sound bar through the external device interface unit in a state in which the display unit is arranged in an upside-down inverted state, receive the audio delay information from the sound bar through the external device interface unit, and determine an output timing of audio based on the received audio delay information.

Advantageous Effects

According to various embodiments of the present disclosure, if the display device and the sound bar are interlocked, deterioration of audio output quality due to upward sound output can be prevented.

Also, the quality of sound reproduction can be improved by simultaneously outputting the same audio between the display device and the sound bar.

DESCRIPTION OF DRAWINGS

FIGS. 12 to 13 are diagrams illustrating an HDMI ARC CEC protocol for interworking between a display device and a sound bar according to an embodiment of the present disclosure.

FIG. 14 is a diagram illustrating a menu tree for setting an installation type of a display device and whether to activate an interlocking mode according to an embodiment of the present disclosure.

BEST MODE

Hereinafter, embodiments relating to the present disclosure will be described in detail with reference to the drawings. The suffixes "module" and "unit" for components used in the description below are assigned or mixed in consideration of easiness in writing the specification and do not have distinctive meanings or roles by themselves.

A display device according to an embodiment of the present invention, for example, as an artificial display device that adds a computer supporting function to a broadcast receiving function, can have an easy-to-use interface such as a writing input device, a touch screen, or a spatial remote control device as an Internet function is added while fulfilling the broadcast receiving function. Then, with the support of a wired or wireless Internet function, it is possible to perform an e-mail, web browsing, banking, or game function in access to Internet and computers. In order to perform such various functions, standardized general purpose OS can be used.

Accordingly, since various applications are freely added or deleted on a general purpose OS kernel, a display device described herein, for example, can perform various user-friendly functions. The display device, in more detail, can be a network TV, Hybrid Broadcast Broadband TV (HBBTV), smart TV, light-emitting diode (LED) TV, organic light-emitting diode (OLED) TV, and so on and in some cases, can be applied to a smartphone.

Figure 1:
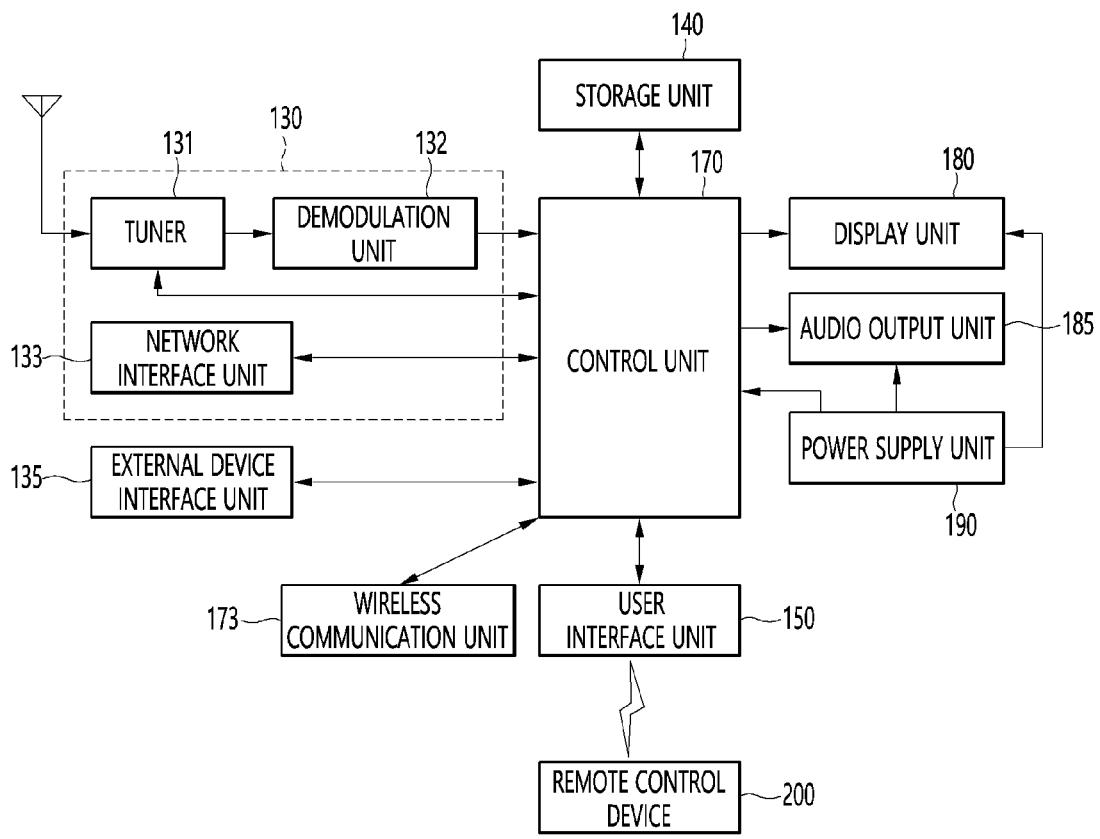
FIG. 1 is a block diagram illustrating a configuration of a display device according to an embodiment of the present invention.

FIG. 1 is a block diagram illustrating a configuration of a display device according to an embodiment of the present invention.

Referring to FIG. 1, a display device 100 can include a broadcast reception unit 130, an external device interface unit 135, a storage unit 140, a user interface unit 150, a control unit 170, a wireless communication unit 173, a display unit 180, an audio output unit 185, and a power supply unit 190.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The external device interface unit 135 can receive an application or an application list in an adjacent external device and deliver it to the control unit 170 or the storage unit 140.

The external device interface unit 135 can provide a connection path between the display device 100 and an external device. The external device interface unit 135 can receive at least one an image or audio output from an external device that is wirelessly or wirely connected to the display device 100 and deliver it to the control unit 170. The external device interface unit 135 can include a plurality of external input terminals. The plurality of external input terminals can include an RGB terminal, at least one High Definition Multimedia Interface (HDMI) terminal, and a component terminal.

An image signal of an external device input through the external device interface unit 135 can be output through the display unit 180. A sound signal of an external device input through the external device interface unit 135 can be output through the audio output unit 185.

An external device connectable to the external device interface unit 135 can be one of a set-top box, a Blu-ray player, a DVD player, a game console, a sound bar, a smartphone, a PC, a USB Memory, and a home theater system, but this is just exemplary.

The network interface unit 133 can provide an interface for connecting the display device 100 to a wired/wireless network including the Internet network. The network interface unit 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100.

The network interface unit 133 can access a predetermined webpage through an accessed network or another network linked to the accessed network. That is, the network interface unit 133 can transmit or receive data to or from a corresponding server by accessing a predetermined webpage through the network.

Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an Internet or content provider or a network operator.

The network interface unit 133 can select and receive a desired application among applications open to the air, through network.

The storage unit 140 can store signal-processed image, voice, or data signals stored by a program in order for each signal processing and control in the control unit 170.

Additionally, the storage unit 140 can perform a function for temporarily storing image, voice, or data signals output from the external device interface unit 135 or the network interface unit 133 and can store information on a predetermined image through a channel memory function.

The storage unit 140 can store an application or an application list input from the external device interface unit 135 or the network interface unit 133.

The display device 100 can play content files (for example, video files, still image files, music files, document files, application files, and so on) stored in the storage unit 140 and provide them to a user.

The user interface unit 150 can deliver signals input by a user to the control unit 170 or deliver signals from the control unit 170 to a user. For example, the user interface unit 150 can receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR.

Additionally, the user interface unit 150 can deliver, to the control unit 170, control signals input from local keys (not shown) such as a power key, a channel key, a volume key, and a setting key.

Image signals that are image-processed in the control unit 170 can be input to the display unit 180 and displayed as an image corresponding to corresponding image signals. Additionally, image signals that are image-processed in the control unit 170 can be input to an external output device through the external device interface unit 135.

Voice signals processed in the control unit 170 can be output to the audio output unit 185. Additionally, voice signals processed in the control unit 170 can be input to an external output device through the external device interface unit 135.

Besides that, the control unit 170 can control overall operations in the display device 100. Additionally, the control unit 170 can control the display device 100 by a user command or internal program input through the user interface unit 150 and download a desired application or application list into the display device 100 in access to network.

The control unit 170 can output channel information selected by a user together with processed image or voice signals through the display unit 180 or the audio output unit 185.

Additionally, according to an external device image playback command received through the user interface unit 150, the control unit 170 can output image signals or voice signals of an external device such as a camera or a camcorder, which are input through the external device interface unit 135, through the display unit 180 or the audio output unit 185.

Moreover, the control unit 170 can control the display unit 180 to display images and control broadcast images input through the tuner 131, external input images input through the external device interface unit 135, images input through the network interface unit, or images stored in the storage unit 140 to be displayed on the display unit 180. In this case, an image displayed on the display unit 180 can be a still image or video and also can be a 2D image or a 3D image.

Additionally, the control unit 170 can play content stored in the display device 100, received broadcast content, and external input content input from the outside, and the content can be in various formats such as broadcast images, external input images, audio files, still images, accessed web screens, and document files.

Moreover, the wireless communication unit 173 can perform a wired or wireless communication with an external electronic device. The wireless communication unit 173 can perform short-range communication with an external device. For this, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication unit 173 can detect (or recognize) a communicable wearable device around the display device 100. Furthermore, if the detected wearable device is a device authenticated to communicate with the display device 100, the control unit 170 can transmit at least part of data processed in the display device 100 to the wearable device through the wireless communication unit 173. Accordingly, a user of the wearable device can use the data processed in the display device 100 through the wearable device.

The display unit 180 can convert image signals, data signals, or on-screen display (OSD) signals, which are processed in the control unit 170, or images signals or data signals, which are received in the external device interface unit 135, into R, G, and B signals to generate driving signals.

Furthermore, the display device 100 shown in FIG. 1 is just one embodiment of the present invention and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present invention and its specific operation or device does not limit the scope of the present invention.

According to another embodiment of the present invention, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents input from the image processing device.

In this case, an operating method of a display device according to an embodiment of the present invention described below can be performed by one of the display device described with reference to FIG. 1, an image processing device such as the separated set-top box, and a content playback device including the display unit 180 and the audio output unit 185.

Figure 2:
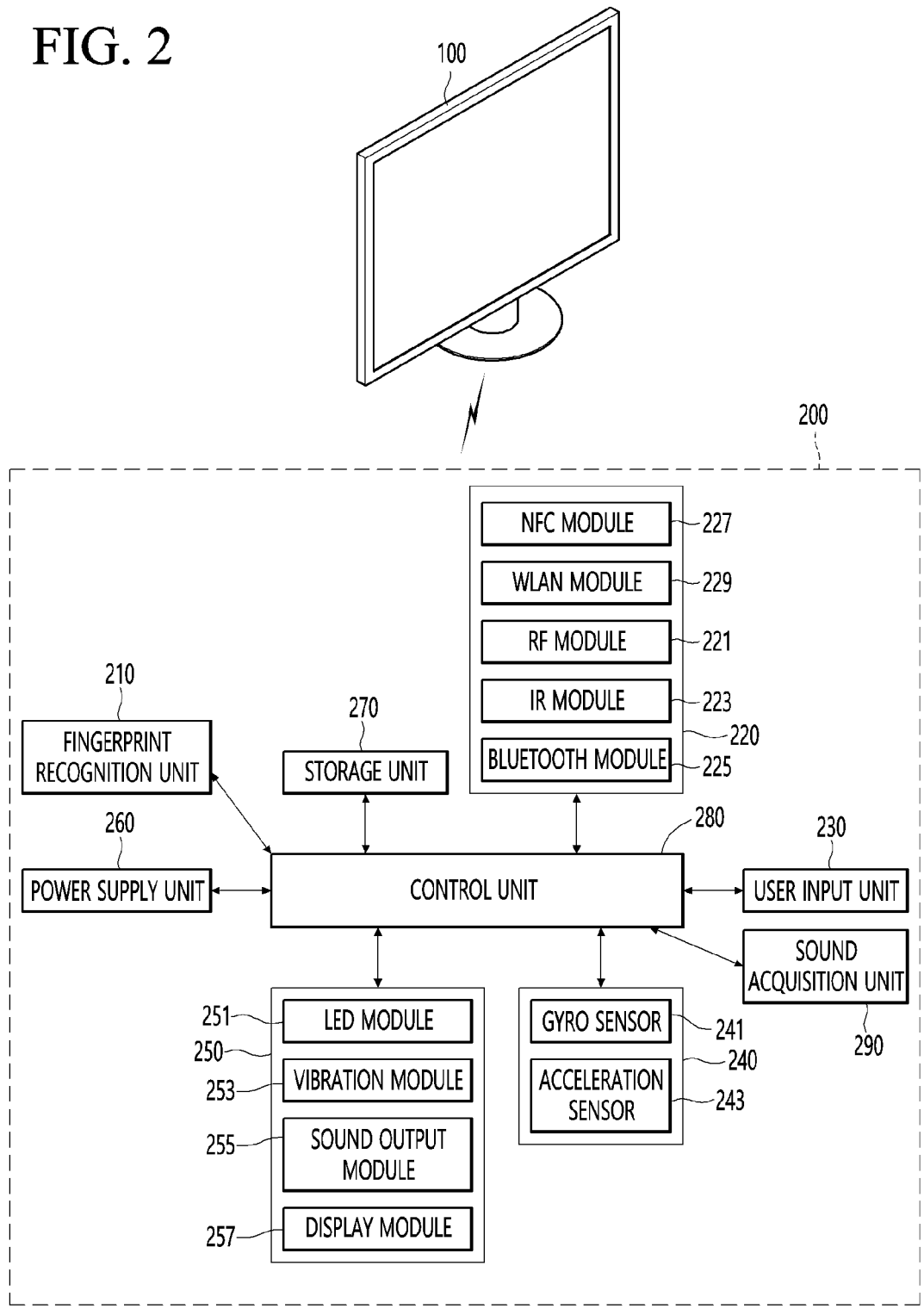
FIG. 2 is a block diagram illustrating a remote control device according to an embodiment of the present invention.
Figure 3:
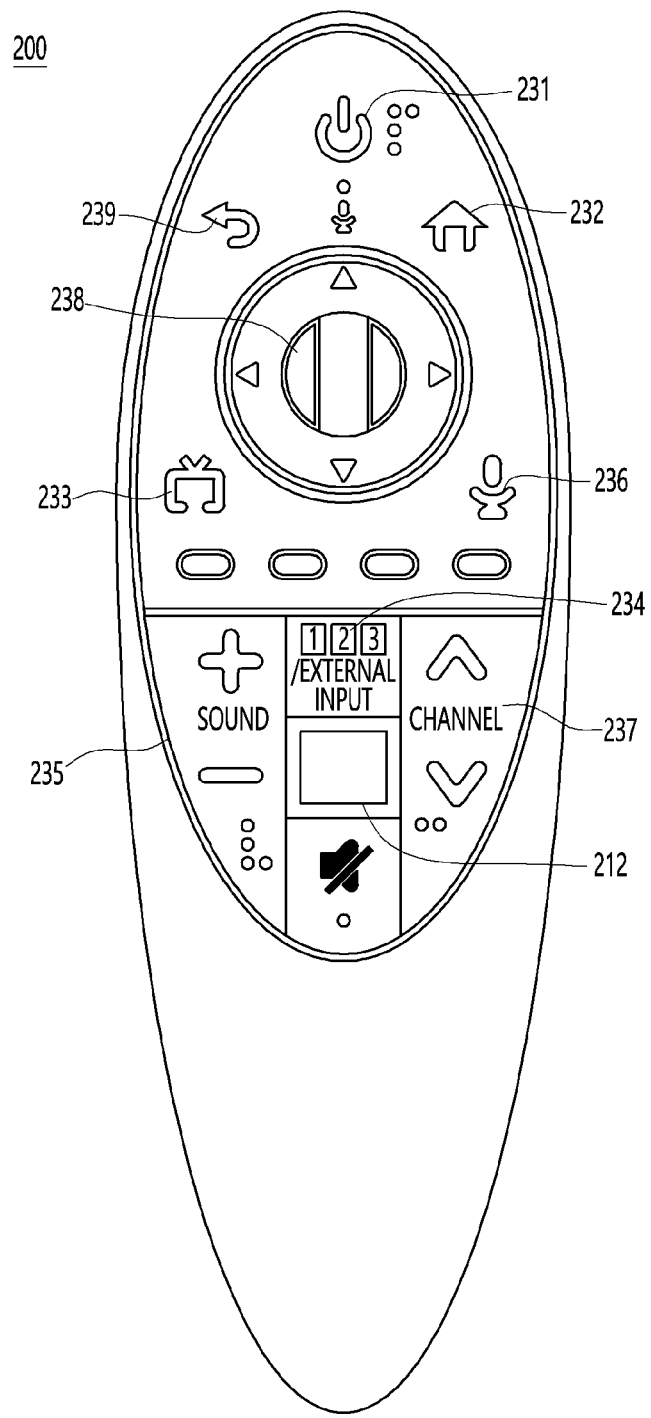
FIG. 3 is a view illustrating an actual configuration of a remote control device according to an embodiment of the present invention.

Then, referring to FIGS. 2 and 3, a remote control device is described according to an embodiment of the present invention.

FIG. 2 is a block diagram illustrating a remote control device according to an embodiment of the present invention and FIG. 3 is a view illustrating an actual configuration of a remote control device according to an embodiment of the present invention.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a control unit 280, and a sound acquisition unit 290.

Referring to FIG. 2, the wireless communication unit 220 transmits/receives signals to/from an arbitrary any one of display devices according to the above-mentioned embodiments of the present invention.

The remote control device 200 can include a radio frequency (RF) module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include a Near Field Communication (NFC) module 227 for transmitting/receiving signals to/from the display device 100 according to the NFC communication standards and a WLAN module 229 for transmitting/receiving signals to/from the display device 100 according to the Wireless LAN (WLAN) communication standards.

Additionally, the remote control device 200 can transmit signals containing information on a movement of the remote control device 200 to the display device 100 through the wireless communication unit 220.

Moreover, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present invention, the fingerprint recognition button 212 can perform a push operation and receive a push operation and a fingerprint recognition operation. The power button 231 can be button for turning on/off the power of the display device 100. The home button 232 can be a button for moving to the home screen of the display device 100. The live button 233 can be a button for displaying live broadcast programs. The external input button 234 can be a button for receiving an external input connected to the display device 100. The voice adjustment button 235 can be a button for adjusting the size of a volume output from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, referring to FIG. 2, if the user input unit 230 includes a touch screen, a user can touch a soft key of the touch screen to input a command relating to the display device 100 to the remote control device 200. Additionally, the user input unit 230 can include various kinds of input means manipulated by a user, for example, a scroll key and a jog key, and this embodiment does not limit the scope of the present invention.

The sensor unit 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display unit 180 of the display device 100.

The output unit 250 can output image or voice signals in response to manipulation of the user input unit 230 or image or voice signals corresponding to signals transmitted from the display device 100. A user can recognize whether the user input unit 230 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 230 is manipulated or signals are transmitted/received to/from the display device 100 through the wireless communication unit 220.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for control or operation of the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 can store, in the storage unit 270, information on a frequency band for transmitting/receiving signals to/from the display device 100 paired with the remote control device 200 and refer to it.

The control unit 280 controls general matters relating to control of the remote control device 200. The control unit 280 can transmit a signal corresponding to a predetermined key manipulation of the user input unit 230 or a signal corresponding to movement of the remote control device 200 sensed by the sensor unit 240 to the display device 100 through the wireless communication unit 220.

Additionally, the sound acquisition unit 290 of the remote control device 200 can obtain voice. The sound acquisition unit 290 can include at least one microphone and obtain voice through the microphone 291.

Figure 4:
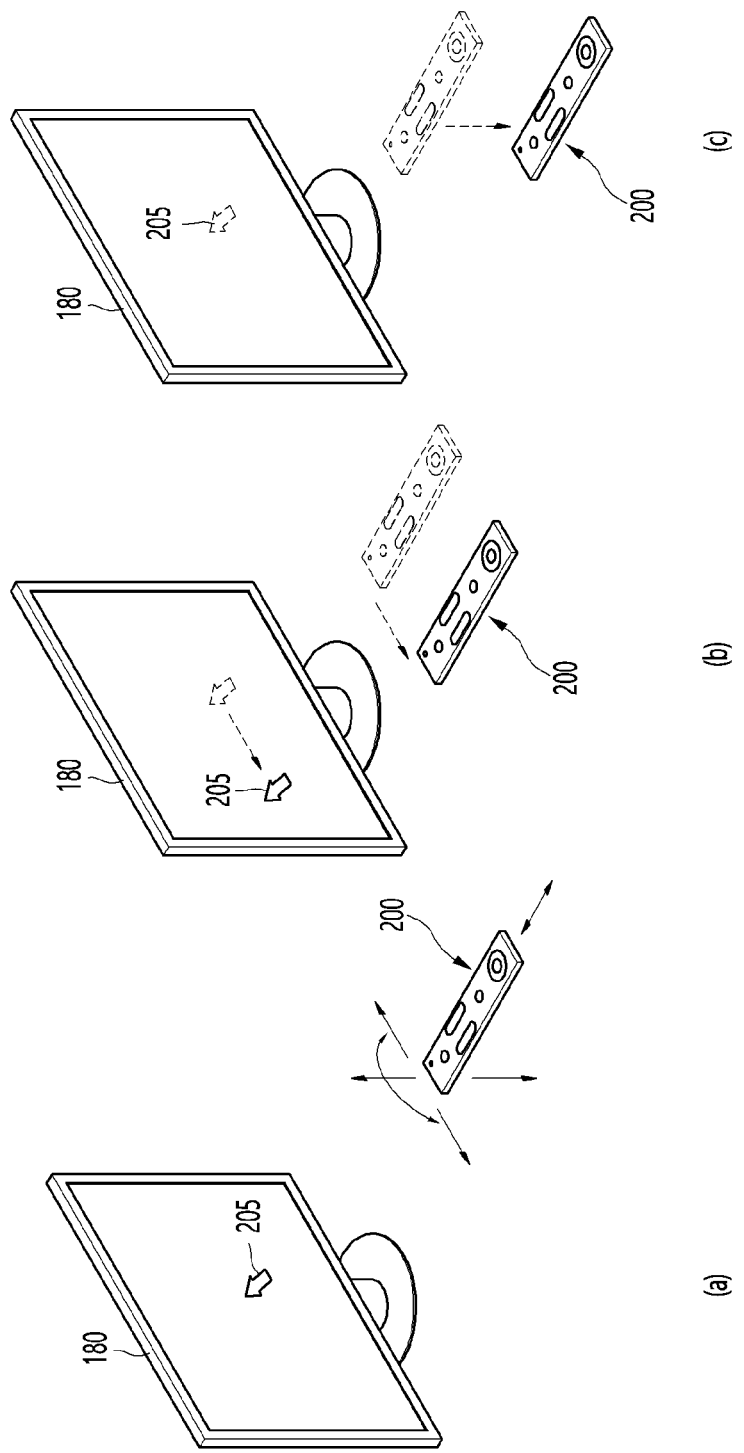
FIG. 4 is a view of utilizing a remote control device according to an embodiment of the present invention.

FIG. 4 is a view of utilizing a remote control device according to an embodiment of the present invention. FIG. 4(*a*) illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote control device.

FIG. 4(*b*) illustrates that if a user moves the remote control device 200, the pointer 205 displayed on the display unit 180 of the display device 100 is moved to the left according to the movement of the remote control device 200.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4(*c*) illustrates that while a specific button in the remote control device 200 is pressed, a user moves the remote control device 200 away from the display unit 180. Thus, a selection area in the display unit 180 corresponding to the pointer 205 can be zoomed in and displayed larger. On the other hand, if a user moves the remote control device 200 close to the display unit 180, a selection area in the display unit 180 corresponding to the pointer 205 can be zoomed out and displayed in a reduced size.

On the other hand, if the remote control device 200 is moved away from the display unit 180, a selection area can be zoomed out and if the remote control device 200 is moved closer to the display unit 180, a selection area can be zoomed in.

Additionally, if a specific button in the remote control device 200 is pressed, recognition of a vertical or horizontal movement can be excluded. That is, if the remote control device 200 is moved away from or closer to the display unit 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in response to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

HDMI Audio Return Channel (HDMI ARC) may be a function in which an HDMI output port of a sound bar outputs an audio signal output from the display device 100 through an HDMI cable.

If the sound bar and the display device 100 are connected through the ARC function, the user can vividly enjoy high-quality sound through the sound bar.

Figure 5:
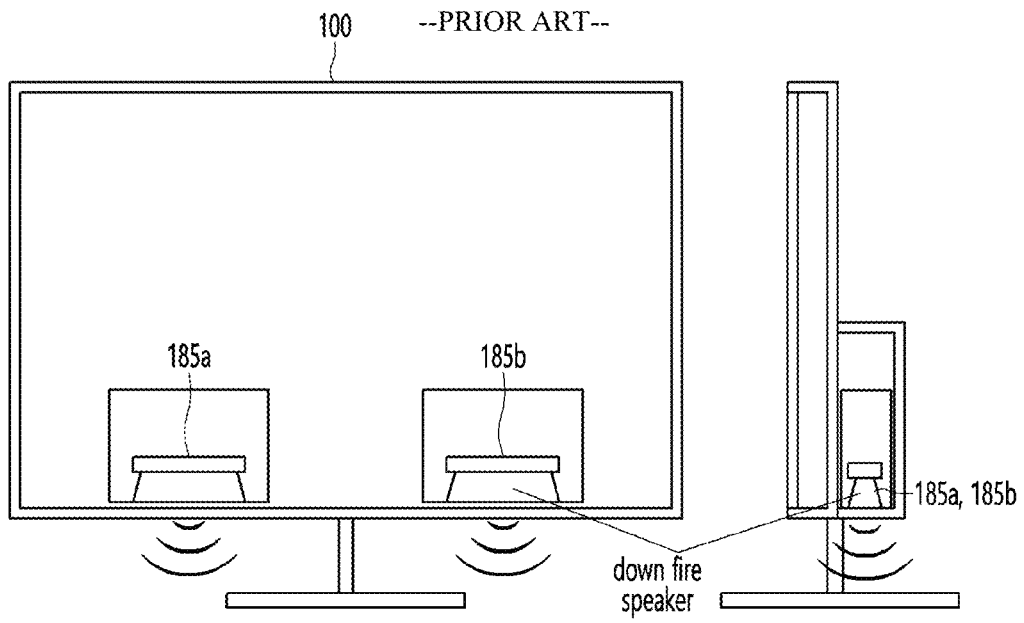
FIGS. 5 to 7 are diagrams for explaining problem that occur if a display device and a sound bar are interlocked according to the prior art.
Figure 6:
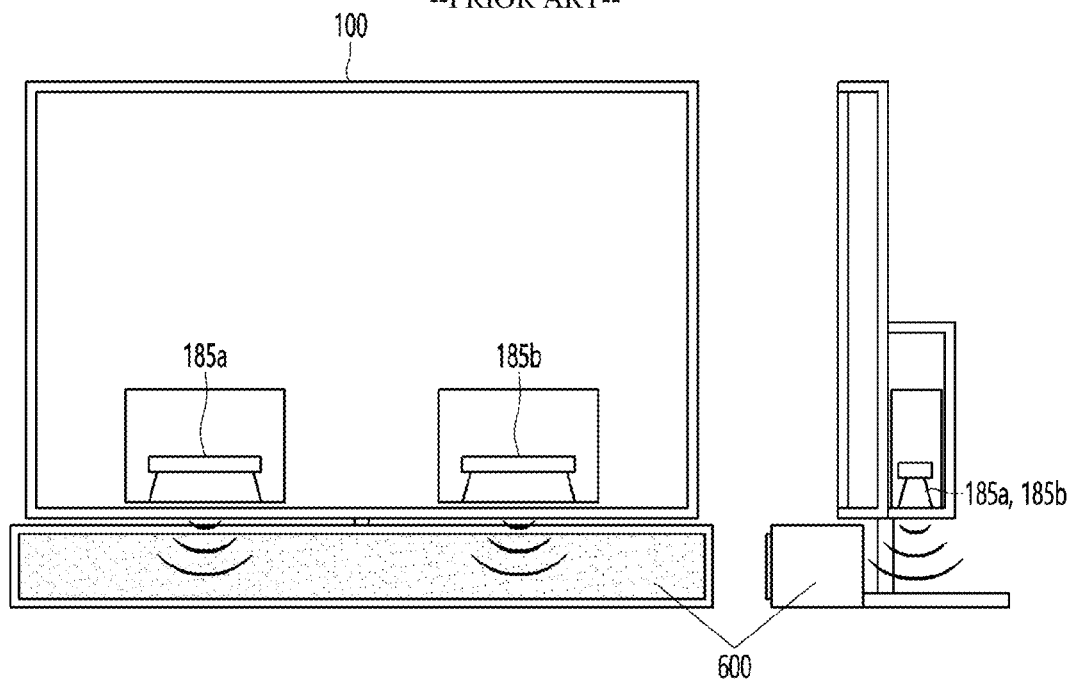
Figure 7:
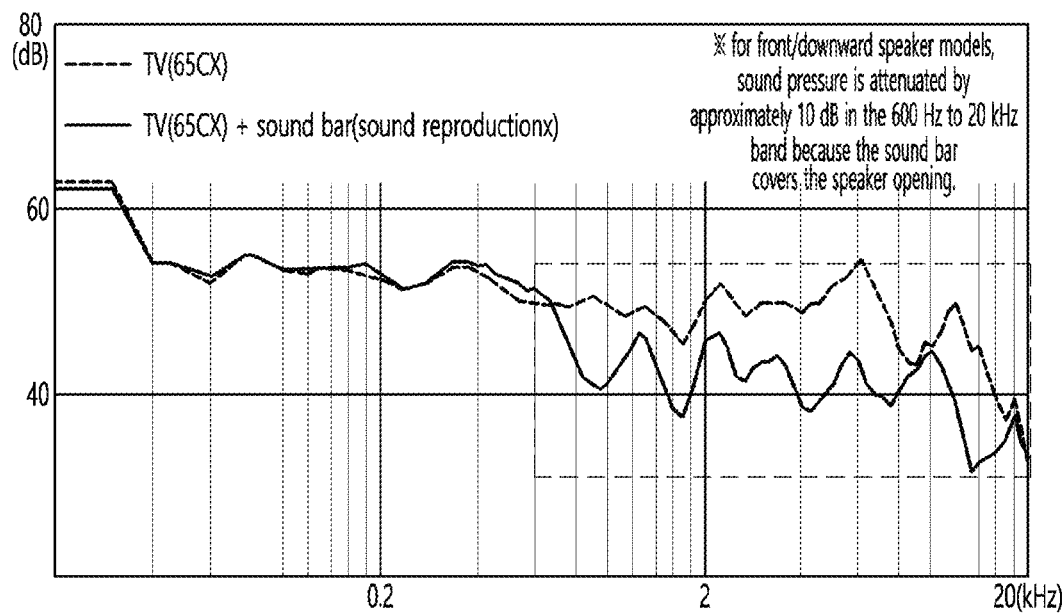

FIGS. 5 to 7 are diagrams for explaining problem that occur if a display device and a sound bar are interlocked according to the prior art.

FIGS. 5 to 7, front view and side view of the display device 100 and the sound bar 600 are shown.

Referring to FIG. 5, the display device 100 includes a downwardly directed first audio output unit 185a and a second audio output unit 185b disposed on a rear surface of the display apparatus 100.

Referring to FIG. 6, if implementing a linkage system between a display device 100 and a sound bar 600 that outputs audio transmitted by the display device 100, a downward-facing first audio output unit 185a and a deterioration of sound quality occurs due to interference between the audio output from the second audio output unit 185b and the audio output from the sound bar 600.

Specifically, referring to FIG. 7, a comparison result of sound characteristic of the case where only the first audio output unit 185a and the second audio output unit 185b provided in the display device (TV, 100) output audio and the case where the first audio output unit 185a, the second audio output unit 185b and the display device (TV, 100), and the sound bar 600 output audio is shown.

The placement of the sound bar 600 blocks the audio output of the first and second audio output units 185a and 185b directed toward the front/bottom of the display device 100, so that the sound sum in the 600 Hz to 20 kHz band is attenuated by 10 dB, this results deterioration of sound quality.

In an embodiment of the present disclosure, this problem can be solved through a upside-down inverted structure of the display device 100.

Figure 8:
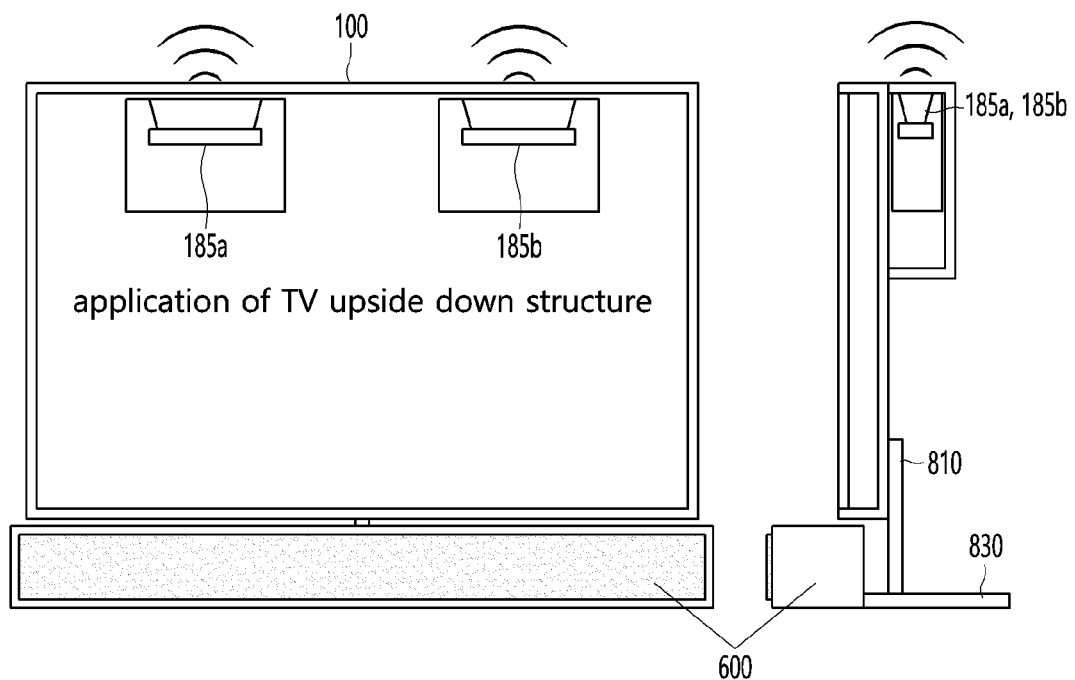
FIG. 8 is a diagram for explaining the structure of a stand-type display device inverted upside-down according to an embodiment of the present disclosure.

FIG. 8 is a diagram for explaining the structure of a stand-type display device inverted upside-down according to an embodiment of the present disclosure.

In FIG. 8, the display device 100 is in the form of a stand and may be supported by a pedestal 830 and a support 810 supporting the display device 100.

Referring to FIG. 8, the display device 100 may be installed upside down unlike in the FIG. 6. Accordingly, the first audio output unit 185a and the second audio output unit 185b directed downward may be directed upward.

The display device 100 may be disposed in an upside-down inverted structure through a separate tilting module disposed on the rear side. The tilting module may be disposed at a connection portion between the support 810 and the rear surface of the display device 100.

The display device 100 may be arranged in the upside-down inverted structure through a tilting module according to a command received from the remote control device 200.

That is, the display device 100 may be changed from the existing layout structure of FIG. 6 to the layout structure of FIG. 8.

Accordingly, interference between the audio output from the first and second audio output units 185a and 185b and the audio output from the sound bar 600 does not occur, so that sound quality degradation can be prevented.

Figure 9:
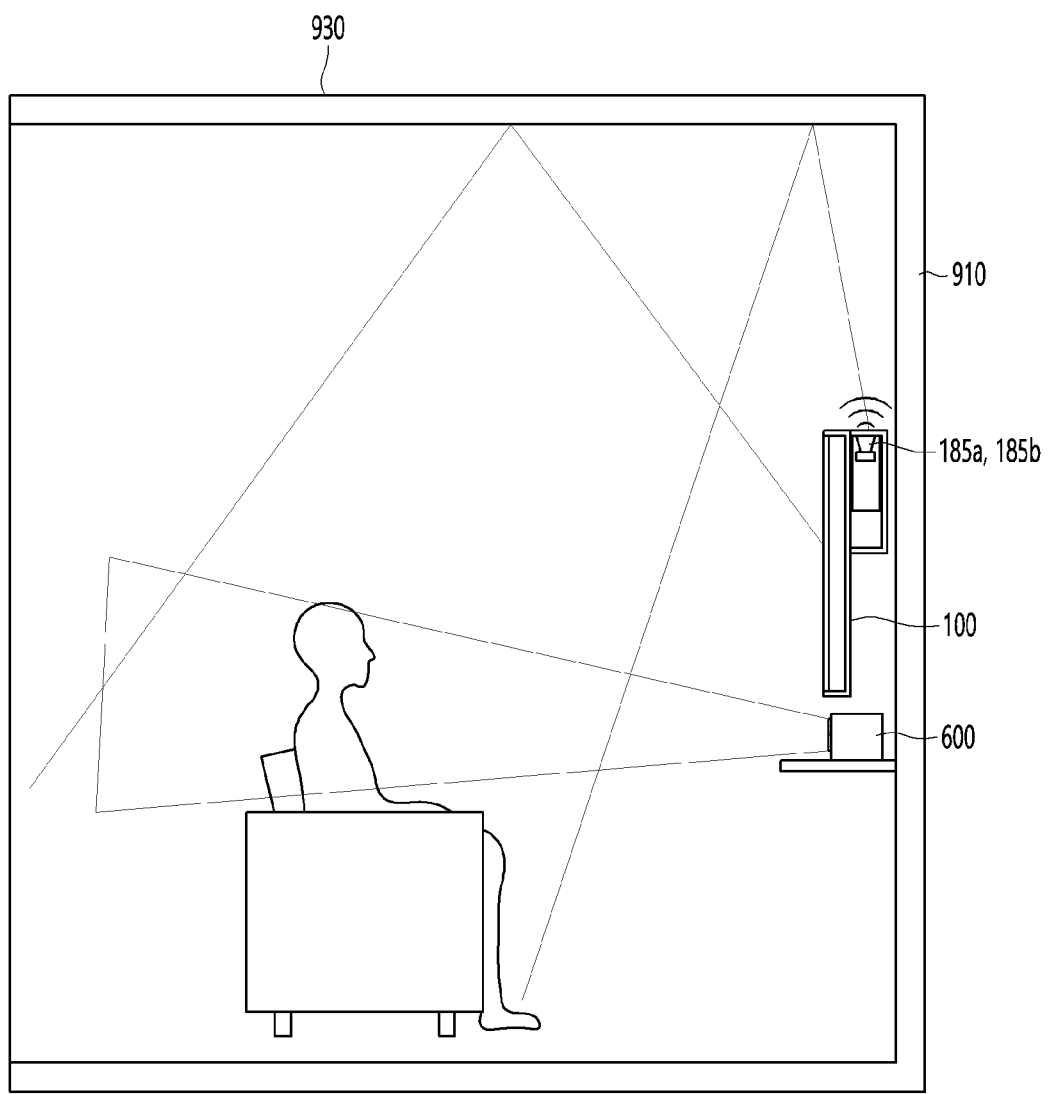
FIG. 9 is a diagram illustrating the structure of a wall-mounted display device inverted upside down according to an embodiment of the present disclosure.

FIG. 9 is a diagram illustrating the structure of a wall-mounted display device inverted upside down according to an embodiment of the present disclosure.

Referring to FIG. 9, the rear surface of the display device 100 may be fastened to and fixed to the front wall 910. As shown in FIG. 8, the display device 100 may be fixed to the front wall 910 in an upside-down state.

In this case, audio output from the sound bar 600 is directed toward the user, and audio output from the first and second audio output units 185a and 185b directed upward is reflected from the ceiling wall 930 and can be directed toward the user.

Accordingly, simultaneous output of audio from the display device 100 and the sound bar 600 is possible without interference between the two audios, and thus sound quality degradation may not occur.

Figure 10:
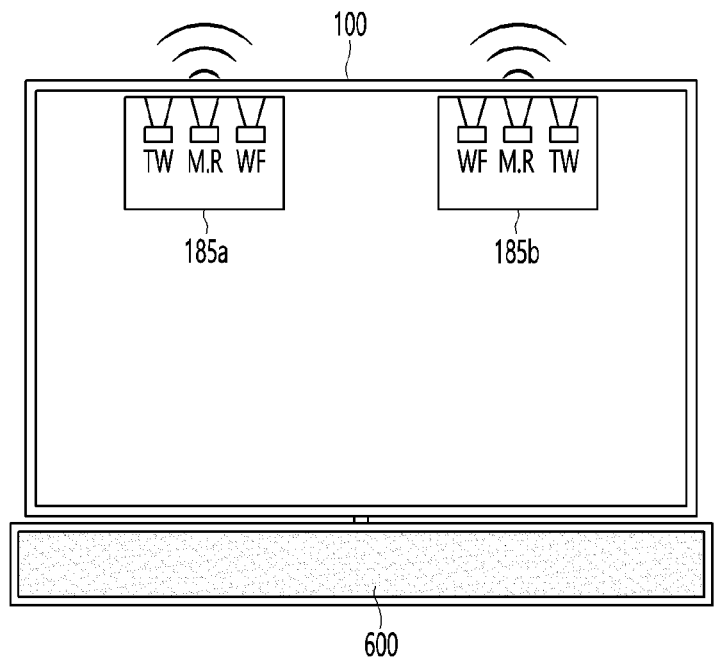
FIG. 10 is a diagram for explaining a specific configuration of first and second audio output units according to an embodiment of the present invention.

FIG. 10 is a diagram for explaining a specific configuration of first and second audio output units according to an embodiment of the present invention.

In FIG. 10, it is assumed that the display device 100 is disposed in an upside-down inverted structure.

The first and second audio output units 185a and 185b are directed upward. Each of the first and second audio output units 185a and 185b may include three speakers TW, M.R, and WF.

It is assumed that the display device 100 configures 4.2 channels and the sound bar 600 configures 7.1.4 channels due to the first and second audio output units 185a and 185b.

Accordingly, the display device 100 and the sound bar interworking system constitute 11.1.4 channels.

Due to the upwardly directed first and second audio output units 185a and 185b, a separate height speaker is not required, and thus cost reduction is possible.

Next, referring to FIG. 11, a method of operating a system according to an embodiment of the present invention will be described.

The system may include the display device 100 and the sound bar 600 having an upside-down inversion structure as shown in FIG. 8.

Figure 11:
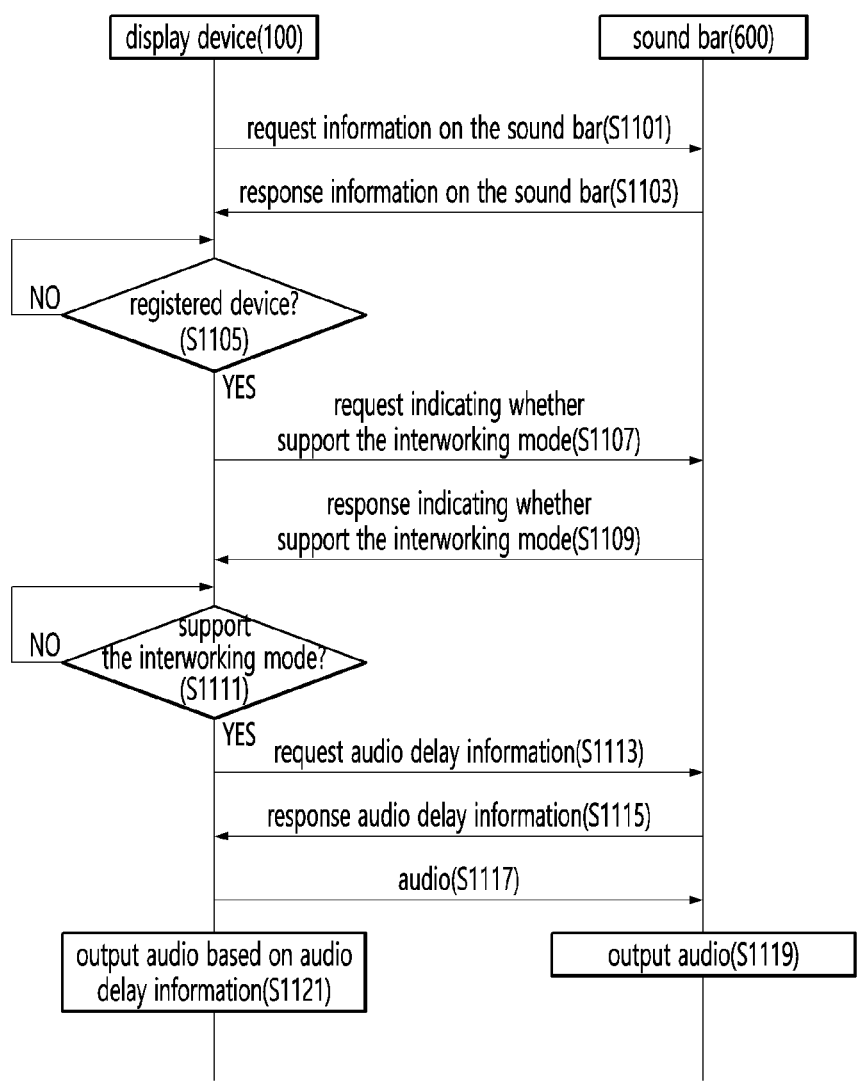
FIG. 11 is a ladder diagram for a method of operating a system according to an embodiment of the present invention.

FIG. 11 is a ladder diagram for a method of operating a system according to an embodiment of the present invention.

The embodiment of FIG. 11 may be performed after the display device 100 and the sound bar 600 are connected through HDMI ARC.

That is, the display device 100 and the sound bar 600 are connected to each other through an HDMI cable.

The control unit 170 of the display device 100 requests information on the sound bar 600 from the sound bar 600 through the external device interface unit 135 (S1101).

The external device interface unit 135 may include an HDMI ARC port.

Information on the sound bar 600 may include one or more of a model name, a manufacturer (or vendor), and an identification number of the sound bar 600.

The control unit 170 of the display device 100 receives a response including information about the sound bar 600 from the sound bar 600 through the external device interface unit 135 (S1103).

The control unit 170 of the display device 100 determines whether the sound bar 600 is a registered device based on the information of the sound bar 600 (S1105).

The control unit 170 may determine whether the sound bar 600 is a registered device based on the manufacturer of the sound bar 600.

If the manufacturer of the sound bar 600 is a previously registered manufacturer, the control unit 170 may determine the connected sound bar 600 as a registered device.

The control unit 170 of the display device 100 transmits a request indicating whether the sound bar 600 supports the interworking mode to the sound bar 1107 through the external device interface unit 135 (S1107).

In one embodiment, the interworking mode may be a mode in which the display device 100 and the sound bar 600 simultaneously output the same audio. In particular, the interworking mode may be a mode in which the display device 100 and the sound bar 600 simultaneously output the same audio using the HDMI ARC function.

In the interworking mode, the display device 100 may output audio through the first and second audio output units 185a and 186b, and the sound bar 600 may output audio received from the display device 100 through the HDMI ARC port.

The control unit 170 of the display device 100 receives a response indicating whether or not the interlocking mode is supported from the sound bar 600 through the external device interface unit 135 (S1109).

The control unit 170 may receive a response including information on whether the interworking mode is supported or not supported from the sound bar 600.

If it is determined through the external device interface unit 135 that the sound bar 600 supports the interworking mode (S1111), the control unit 170 of the display device 100 requests audio delay information (S1113).

In an embodiment, the audio delay information may include a delay time until the sound bar 600 outputs audio transmitted from the display device 100 through the HDMI ARC function.

The delay time may include a post-processing time until the sound bar 600 outputs audio through a speaker. The sound bar 600 may perform post-processing on the audio received from the display device 100 and output the post-processed audio.

Post-processing may include an encoding process of decoded audio.

The control unit 170 may request a delay time from the sound bar 600 to simultaneously output the same audio as that of the sound bar 600 through the first and second audio output units 185a and 185b.

The control unit 170 of the display device 100 receives a response including audio delay information from the sound bar 600 through the external device interface unit 135 (S1115).

Then, the control unit 170 of the display device 100 transmits the audio to the sound bar 1117 (S1117), and the sound bar 600 outputs the received audio (S1119).

The sound bar 600 may encode the received audio and output the encoded audio.

Based on the audio delay information received from the sound bar 600, the control unit 170 of the display device 100 outputs the same audio to the first and second audio output units 185a, 185b synchronized with the audio output from the sound bar 600 (S1121).

The control unit 170 may determine audio output timing using audio delay information, a time to decode audio to be transmitted to the sound bar 600, and a time to set an output path of the decoded audio to the sound bar 600.

The determined audio output timing may be the same as the audio output timing of the sound bar 600.

As described above, according to an embodiment of the present disclosure, if the display device 100 and the sound bar 600 are interlocked through HDMI ARC, the timing of audio output from each is controlled so that audio synchronization may be performed.

FIGS. 12 to 13 are diagrams illustrating an HDMI ARC CEC protocol for interworking between a display device and a sound bar according to an embodiment of the present disclosure.

First, referring to FIG. 12, <Request SB delay> transmitted by the display device 100 (TV) to the sound bar 600 (SB) may be a request for an audio delay value of the sound bar 600. The audio delay value may be a delay time until the sound bar 600 outputs the received audio.

The sound bar 600 may transmit <Response SB delay> to the display device 100 in response to <Request SB delay>. <Response SB delay> may include an audio delay value.

<Request SB delay> may correspond to step S1113 of FIG. 11, and <Response SB delay> may correspond to step S1115 of FIG.

<Request support Symphony sound bar> may be a request indicating whether the sound bar 600 supports the interworking mode. Whether the interlocking mode is supported may indicate whether the sound bar 600 supports the Symphony sound bar.

<Response support Symphony sound bar> may be a response indicating whether an interworking mode corresponding to <Request support Symphony sound bar> is supported.

If the parameter value of <Response support Symphony sound bar> is 0, interlocking mode is not supported, and if 1, interlocking mode is supported.

<Set soundbar volume> may include a set volume of the sound bar 600 for volume synchronization of the display device 100.

<Give status of block sound effect> may indicate whether the sound field effect key provided in the sound bar 600 is blocked.

If the parameter value of <Give status of block sound effect> is 0, the sound field effect key is released, and if the parameter value is 1, it may indicate that the sound field effect key is blocked.

Next, FIG. 13 will be described.

Referring to FIG. 13, <Request AI sound mode> may be a request inquiring whether the display device 100 supports the AI sound mode. If the parameter value of <Response AI sound mode> is 0, it may indicate that the AI sound mode is not supported, and if it is 1, the AI sound mode is supported.

FIG. 14 is a diagram illustrating a menu tree for setting an installation type of a display device and whether to activate an interlocking mode according to an embodiment of the present disclosure.

The menu tree 1400 may include an installation type item 1410 and an interlocking mode item 1430 of the display device 100.

The installation type item 1410 may include a stand type, a wall hanging type, and an upside-down inversion type of the display device 100.

The display device 100 may display the installation type item 1410 of the display device 100 through the UI menu and determine the installation type as the selected type according to a user input.

The interlocking mode item 1430 may be an item for activating or inactivating an interlocking mode between the display device 100 and the sound bar 600.

The display device 100 may display the linkage item 1430 through the UI menu and activate or deactivate the linkage mode according to a user input.

Figure 15:
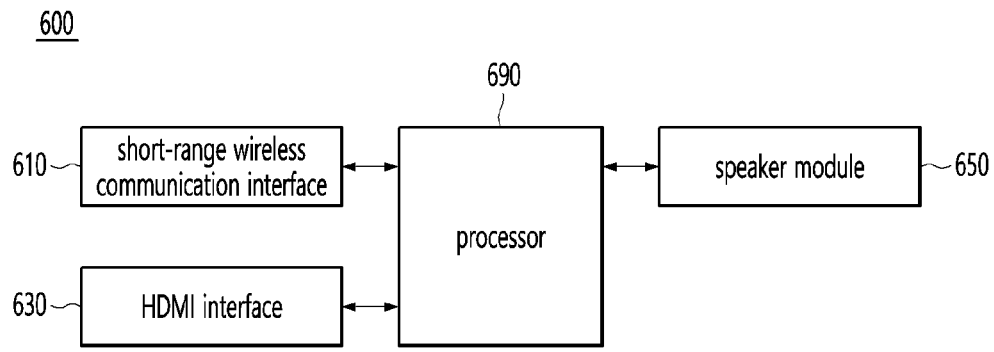
FIG. 15 is a block diagram illustrating a configuration of a sound bar according to an exemplary embodiment of the present disclosure.

FIG. 15 is a block diagram illustrating a configuration of a sound bar according to an exemplary embodiment of the present disclosure.

Referring to FIG. 15, the sound bar 600 may include a short-range wireless communication interface 610, a HDMI interface 630, a speaker module 650 and a processor 690.

The short-range wireless communication interface 610 may perform wireless communication with the display device 100 through short-range wireless communication standard. The short-distance wireless communication standard may be any one of Bluetooth and Wi-Fi.

The HDMI interface 630 may include an HDMI ARC output port. The HDMI interface 630 may be connected to the display device 100 through an HDMI cable, and information may be exchanged.

The speaker module 650 may include one or more speakers. The speaker module 650 may output audio received from the display device 100.

The processor 690 may control the overall configuration of the sound bar 600.

Figure 16:
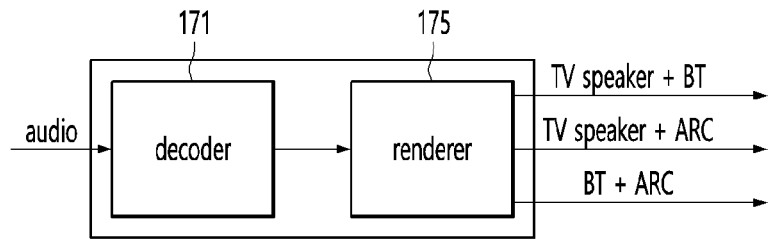
FIG. 16 is a diagram explaining a configuration for setting an audio output path according to an embodiment of the present invention.

FIG. 16 is a diagram explaining a configuration for setting an audio output path according to an embodiment of the present invention.

Referring to FIG. 16, the control unit 170 of the display device 100 may include a decoder 171 and a renderer 175.

The decoder 171 may decode audio and deliver the decoded audio to the renderer 175.

The renderer 175 may determine an output path of decoded audio according to user setting.

For example, the renderer 175 may transmit audio to the first and second audio output units 185a and 185b of the display device 100 and the Bluetooth module of the sound bar 600 if audio output is set to output through the first and second audio output units 185a and 185b of the display device 100 and the sound bar 600 via Bluetooth.

If audio output is set to output through the first and second audio output units 185a and 185b of the display device 100 and the HDMI ARC port of the sound bar 600, the renderer 175 may output audio to the first and second audio output units 185a and 185b of the display device and the sound bar 600 through the HDMI ARC port.

If output audio through the Bluetooth module of the sound bar 600 and the HDMI ARC of the sound bar 600 is set, the renderer 175 may transmit audio to the Bluetooth module and the HDMI ARC port of the sound bar 600, respectively.

Audio output setting may be set through the UI menu for the audio output path.

The control unit 170 may set an audio output path upon receiving a user input on the UI menu.

Users can play audio through various audio output path.

Figure 17:
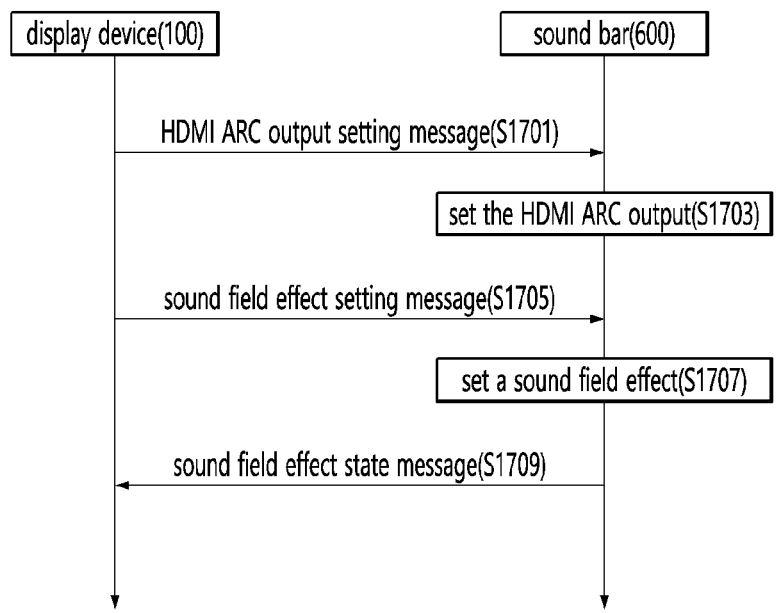
FIG. 17 is a diagram for explaining a method of operating a system according to another embodiment of the present disclosure.

FIG. 17 is a diagram for explaining a method of operating a system according to another embodiment of the present disclosure.

The display device 100 and the sound bar 600 are connected to each other through an HDMI cable.

The display device 100 transmits the HDMI ARC output setting message to the sound bar 600 (S1701).

The HDMI ARC output setting message may be a message for setting the sound bar 600 to output audio transmitted from the display device 100 through the HDMI ARC function.

The sound bar 600 sets the HDMI ARC output of audio based on the received HDMI ARC output setting message (S1703).

Then, the display device 100 transmits a sound field effect setting message to the sound bar 600 (S1705).

The sound field effect setting message may be a message for setting the sound field effect of the sound bar 600 on or off.

The sound bar 600 sets a sound field effect based on the received sound field effect setting message (S1707).

The sound field effect of the sound bar 600 may be activated or deactivated according to the sound field effect setting message.

The sound bar 600 transmits a sound field effect message indicating the setting state of the set sound field effect to the display device 100 (S1709).

According to one embodiment of the present invention, the above-described method can be implemented as a processor-readable code in a medium on which a program is recorded. Examples of media readable by the processor include ROM, RAM, CD-ROM, magnetic tape, floppy disk, optical data storage, and the like.

The display device described above is not limited to the configuration and method of the above-described embodiments, but the embodiments may be configured by selectively combining all or part of each embodiment so that various modifications can be made.

The invention claimed is:

1. A display device comprising:
   a display device;
   an audio output device disposed below the display device;
   an external device interface device connected to a sound bar through a High-Definition Multimedia Interface (HDMI) Audio Return Channel (HDMI ARC); and
   a control device configured to:
   request audio delay information from the sound bar through the external device interface device based on the display device being arranged in an upside-down inverted state,
   receive the audio delay information from the sound bar through the external device interface device, and
   determine an output timing of audio based on the received audio delay information, the audio delay information including:

a delay time until the sound bar outputs the audio transmitted through the external device interface unit, a time to decode audio to be transmitted to the sound bar, and a time to set an output path of the decoded audio to the sound bar.

2. The display device of claim 1,
wherein the control device is configured to request:
whether the sound bar supports an interlocking mode, and
the audio delay information from the sound bar based on the sound bar confirming support for the interlocking mode, and
wherein the interlocking mode is a mode in which the audio output device and the sound bar simultaneously output the same audio.

3. The display device of claim 2, wherein the control device is configured to control the display device to display a user interface (UI) menu for setting each of the upside-down inverted arrangement state of the display device and the interlocking mode on the display device.

4. The display device of claim 1, wherein the audio output device includes a first audio output device and a second audio output device, the first audio output device and the second audio output device being disposed to direct sound upward.

5. The display device of claim 1, further comprising a short-range wireless communication device configured to wirelessly transmit the audio to the sound bar.

6. The display device of claim 1, wherein the control device is configured to transmit the audio to the sound bar through the external device interface device, and to determine the output timing so that the sound bar and the audio output device simultaneously output the audio.

7. A method of operating a display device including a display device, an audio output device disposed below the display device, and an external device interface device connected to a sound bar through a High-Definition Multimedia Interface (HDMI) Audio Return Channel (HDMI ARC), comprising:

requesting audio delay information from the sound bar through the external device interface device based on the display device being arranged in an upside-down inverted state;

receiving the audio delay information from the sound bar through the external device interface device; and determining an output timing of audio based on the received audio delay information, the audio delay information including:

a delay time until the sound bar outputs the audio transmitted through the external device interface unit, a time to decode audio to be transmitted to the sound bar, and a time to set an output path of the decoded audio to the sound bar.

8. The method of claim 7, further comprising:
requesting whether the sound bar supports an interlocking mode, and
requesting the audio delay information from the sound bar based on the sound bar confirming support for the interlocking mode,
wherein the interlocking mode is a mode in which the audio output device and the sound bar simultaneously output the same audio.

9. The method of claim 8, further comprising:
displaying a user interface (UI) menu for setting each of the upside-down inverted arrangement state of the display device and the interlocking mode on the display device.

10. The method of claim 7, wherein the audio output device includes a first audio output device and a second audio output device, the first audio output device and the second audio output device are disposed to direct sound upward.

11. The method of claim 7, further comprising:
transmitting the audio to the sound bar through the external device interface device,
wherein the determining step comprises:
determining the output timing so that the sound bar and the audio output device simultaneously output the audio.

* * * * *